Patented Nov. 2, 1937

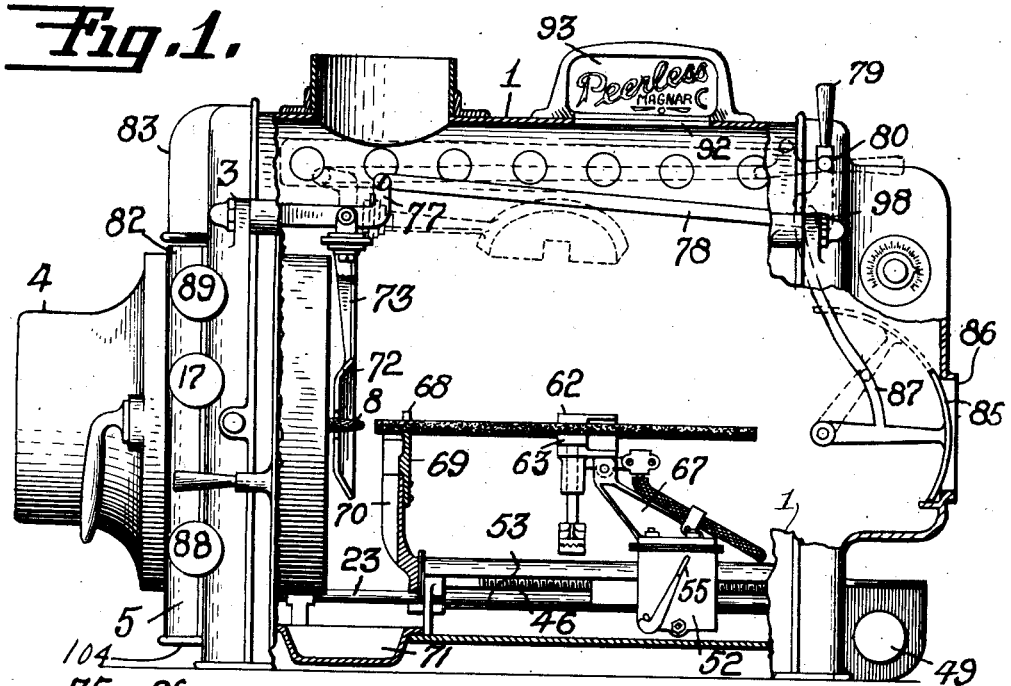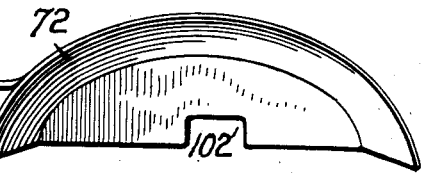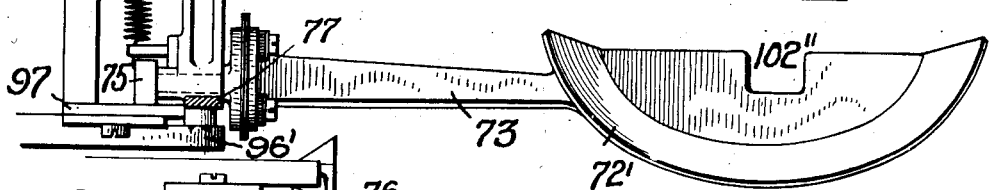

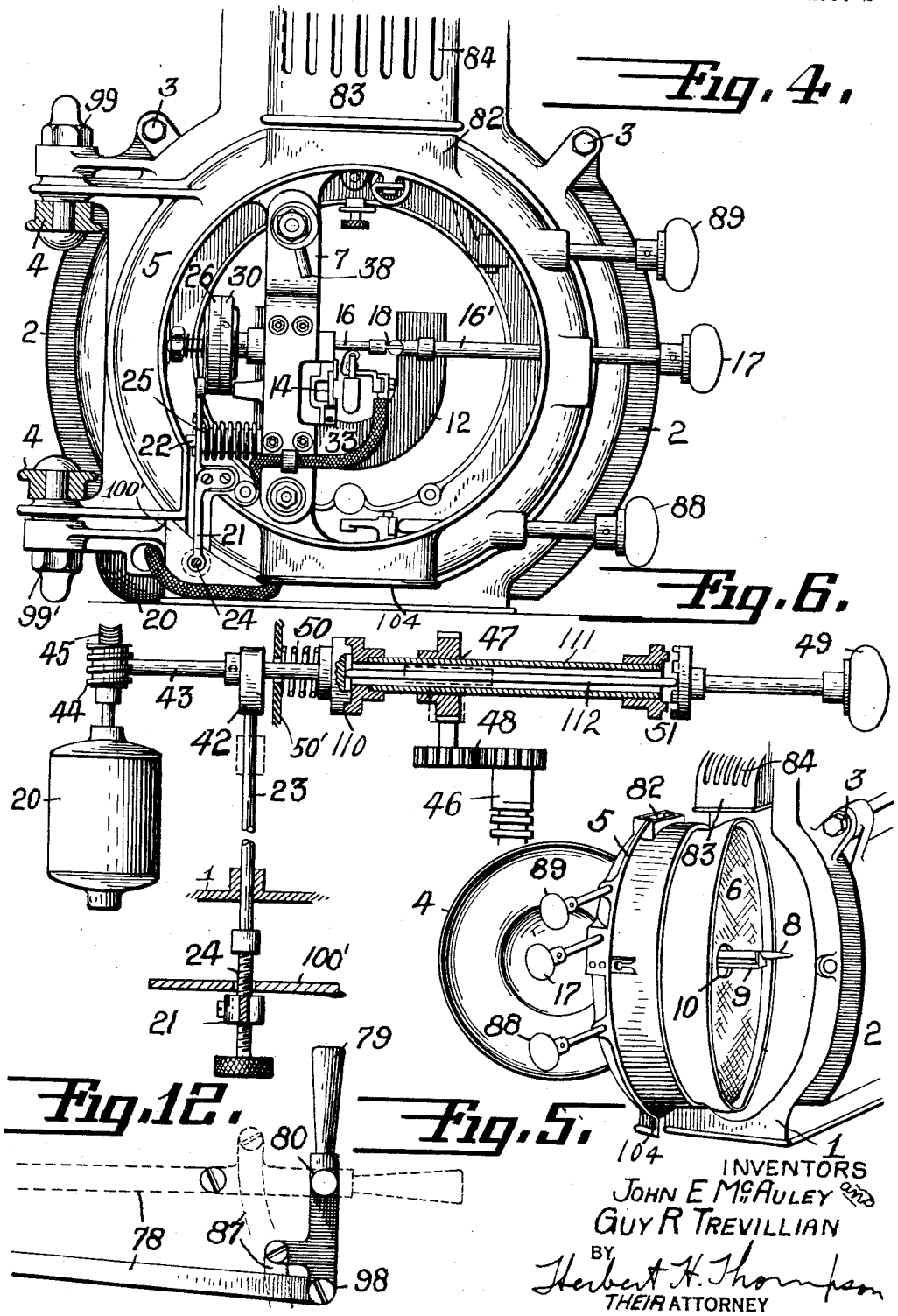

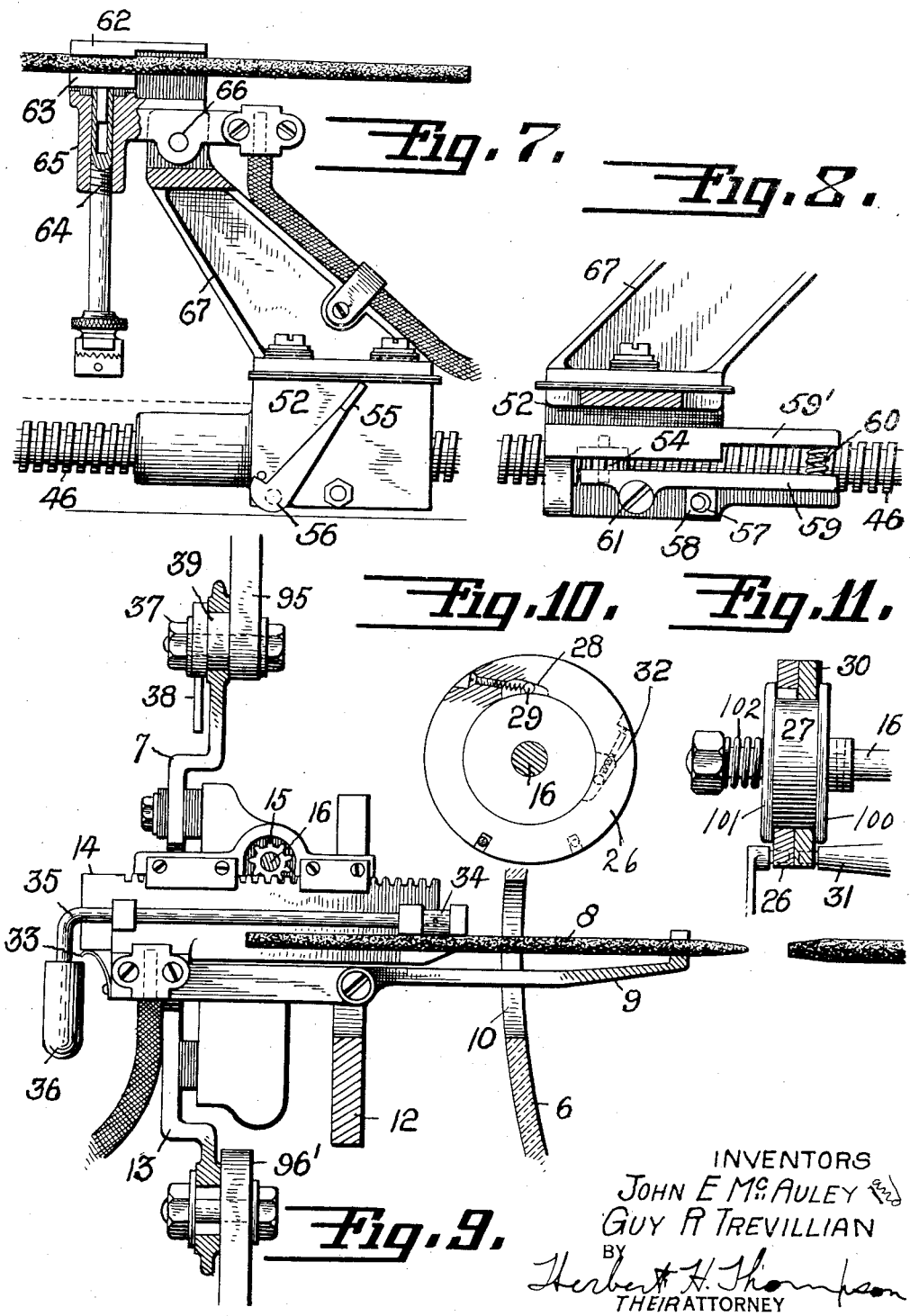

2,097,767

UNITED STATES PATENT OFFICE 2,097,767

PROJECTOR LAMP

John E. McAuley and Guy R. Trevillian, Chicago, Ill., assignors to J. E. McAuley Mfg. Co., Chicago, Ill., a corporation of Delaware Application September 21, 1935, Serial No. 41,551

19 Claims. (Cl. 176—51)

This invention relates to projector lamps of the high intensity arc type, especially adapted for the projection of motion pictures. The principal objects of the invention are to simplify the structure of such lamps so as to permit ready access to the electrode holders for recarboning, adjustment, cleaning of the reflector, and other purposes.

Another object is to provide an improved occulter or light extinguishing shutter of simple, but effective construction, which in its inoperative position lies entirely without the projected beam.

Other purposes will be apparent as the description proceeds.

Referring to the drawings disclosing the preferred form of our invention.

Fig. 1 is a side elevation of my projector lamp with a portion of the side door and top removed to show the interior thereof.

Fig. 2 is an enlarged plan view of the shutter or occulter in the raised or inoperative position.

Fig. 3 is a detail of the operating cams for the same.

Fig. 4 is a rear elevation of the projector lamp with the rearmost door open or cut away.

Fig. 5 is a perspective view of the rear portion of the lamp, showing both the rear door and the intermediate hinged part open.

Fig. 6 is a diagrammatic plan view showing how both electrodes are fed from the same motor.

Fig. 7 is a side view, partly in section, of the positive electrode holder.

Fig. 8 is a similar view of the lower portion thereof from the opposite side.

Fig. 9 is a side elevation, partly in section, of the negative electrode holder.

Fig. 10 is a detail of the feeding ratchet for the negative electrode.

Fig. 11 is another detail of the same, taken at right angles to Fig. 10 and showing the pawl or clutch rings in section.

Fig. 12 is a detail of the operating means for the occulter.

The entire lamp is enclosed within a main housing 1 provided with side doors 2 which may be raised, to give access to the positive carbon, on hinge rods 3 running along each side of the top of the structure. At the back of the lamp housing or drum 1, we provide an outer hinged door 4 and an inner section 5 also hinged on common hinge pins 99, 99', the latter serving as a mounting both for the reflector or projector 6 and for the entire negative electrode holder 7 and its operating means. By this construction the lamp structure may be opened up (see Fig. 5), the reflector cleaned and inspected, etc. Within this member 5 and to the rear of the mirror 6, there is mounted the major portion of the negative electrode holder and a permanent magnet 12; the negative electrode 8 and the finger 9, which supports the forward portion thereof and forms a part of the holder, projecting through a central aperture 10 in the mirror. Magnet 12, in combination with this type of high intensity arc, forms the subject matter of my prior application for Letters Patent, Serial No. 26,117, filed June 12, 1935, and is not claimed herein. The member 9 is provided with a V-shaped notch at its forward end and is secured to the supporting bracket 13, which is adjustably secured to fixed bracket 95. Slidably mounted on bracket 13 with a loose fit is a rack bar 14 which may be moved back and forth by a pinion 15 meshing therewith on shaft 16. At the rear end of the rack 14 we provide a short spring 33 which normally holds the rack slightly elevated at the rear, but which permits adjustment thereof to align the two electrodes. The negative electrode is gripped to the rear of the arcing tip by cam surfaces 34 on a shaft 35. By rotating the handle 36 thereon, the electrode is gripped or released at will. The position of the holder may also be adjusted by loosening the nut 37 and turning the pin 38 by which an eccentric 39 within the bracket 13 is turned to raise or lower or displace said bracket, in which the rack bar 14 is slidably mounted.

For hand adjustment, feed shaft 16 may be turned by a knob 17 on a shaft 16' connected to shaft 16 through a universal joint 18. The shaft 16 is also fed automatically from a feed motor 20, which also preferably feeds the positive electrode, but the driving connection or coupling between the negative feed and motor is such that it only requires juxtaposition to transmit power. In other words, the entire hinged member 5 may be swung open without disconnecting any parts, and as soon as it is closed again the power transmitting coupling is operative. Such a mechanism is shown as in the form of an arm 21 pivoted at 22 and reciprocated by the engagement of a reciprocatory shaft 23 with the lower end of said arm. Preferably an adjustable set screw 24 is mounted at the lower end of the arm so as to vary the relative amount of lost motion between said parts, to vary the stroke and rate of feed of the negative. The arm 21 is normally biased by a coil spring 25 to tend to close contact between parts 23 and 24, but the forward advance may be limited by a front plate 100'. Said arm is connected at its upper end to a ring 26 in which is mounted a ratchet or one-way clutch device engaging the drum 27, loosely mounted on the feed shaft 16 and coupled thereto by a slip friction clutch comprising a disc 100 pinned to shaft 16 and an opposite disc 101 spring pressed by spring 102 to clamp drum 27 therebetween. An inclined recess 28 is provided within the ring 26, in which is a spring pressed roller 29 which will grip the drum when the ring is rotated in one direction, but release it when said ring is rotated in the other direction.

Owing to the small amount of power transmitted and the small friction of the system, we find it preferable to provide a second ratchet mechanism to prevent the drum from turning backward during the return stroke of the main pawl or clutch ring. To this end, there is shown a second ring 30 which is prevented from rotating by a fixed pin 31 and which has a similar pawl clutch 32 operating to prevent reverse movement of drum 27. Slip friction clutch 100—101 is relatively weak so that knob 17 may be turned in either direction for hand feed by slipping the clutch.

The said shaft 23 is reciprocated from the driving motor 20 by means of a cam 42 mounted on a transverse shaft 43 rotated from the motor 20 by any suitable gearing, such as worm 44 and worm wheel 45. The same shaft 43 may rotate the feed screw 46 for the positive electrode holder, actuating the same through suitable gearing such as helical gearing 47 and spur gearing 48. For slow hand feeding there may be provided a knob 49 which may be pushed in against the axial spring 50, abutting at its outer end against fixed plate 50', to engage the teeth on clutch 51 and turn the shaft 43, this being permitted by providing a second clutch 110 between shaft 43 and a sleeve 111, which is released when clutch 51 is closed by push rod 112 within the sleeve, so that the positive feed may be manually adjusted without interrupting the automatic negative feed.

Ventilation for the negative holder and mirror is provided by an inlet 104 at the bottom behind the mirror so that the cooling air will not disturb the arc. The air rises behind the mirror around the negative holder and emerges through an outlet 82 at the top which, when the hinged part 5 is closed, registers with a chimney 83 in the fixed housing, the hot air escaping through the grill work 84 therein. Fig. 4 shows how the negative holder is readily accessible for recarboning merely by opening back door 4, since it lies mainly to the rear of the reflector mirror.

The positive holder 52 is shown as slidably mounted on track rods 46 and 53 within the lamp box and is normally fed by the rotation of one rod 46, formed as a feed screw. Means are provided, however, for quick adjustment of the positive electrode by releasing it from the feed screw and sliding it directly along the trackway. For this purpose there is shown mounted on the lower part of said holder a pinion 54, the threads of which normally register with the threads on the feed screw and which is normally fixed against rotation, but is releasable at will. To this end, the pinion is journaled between a pivoted jaw 59 and a fixed part 59'. A lever 55, on the shaft 56 of which is an eccentric 57, serves to raise a block 58 upwardly to rock the lever 59 upwardly against the action of spring 60 and about its pivot 61. This action lowers the opposite end of the lever with respect to said pinion so as to free the locked pinion and permit it to freely rotate on its own axis. Under these conditions, it will be seen, the positive electrode may be readily slid along the trackway by hand without rotating the feed screw.

The positive electrode is clamped to the rear of the arc between a fixed upper jaw 62 and a movable lower jaw 63 which also serves to introduce current to the arc, the latter being operated by rotating the threaded shaft 64 on which the lower jaw is mounted, the shaft being threaded in a bracket 65 pivoted at 66 on a fixed support 67, the parts having a loose fit as in the negative holder. It will readily be seen, therefore, that a movable support is also provided for the rear portion of the positive electrode holder so as to facilitate the alignment of the tip thereof, the forward portion resting within a V-shaped notch 68 in a fixed guide 69, regardless of irregular shaped electrodes, that is, imperfect or crooked. The loose fit of the holder supports of both electrodes permits exact alignment for the tips of both electrodes by the V-shaped guides 9 and 18 adjacent the forward ends thereof. This is of especial advantage with the long, thin electrodes employed in the modern high intensity projector lamp. Said guide lies adjacent the positive crater and is shown as provided with a vertical channel 70 to guide the particles and ashes dropping from the electrode into the removable catch pan 71.

For preventing damage to the reflector during the striking of the arc and also for occulting purposes, there is shown a pair of complementary, substantially semicircular shutters 72 and 72' which, in the occulting position, lie between the positive crater and the mirror so as to intercept any stray hot particles from the arc and to cut off the light from the crater to the mirror. As shown, they lie to each side of the negative tip, a cut out portion 102' and 102" being provided in each for the electrode. Each of said shutters is mounted on an arm 73 which has secured thereto a short shaft 75 journaled in a cross bar 74 which, in turn, is journaled for rotation about a transverse axis on trunnions 96 and 96'. On the upper end of said shafts 75 are secured cam members 76 and 76' which operate to turn the shafts 75 through a substantial angle as the arms 73 are raised about axis 96—96' due to the engagement of the cams with stops 97 which rotate the same against the action of tension spring 90. By this, or similar, means the shutters clear the positive electrode holder 69 as they are swung upwardly. For operating the occulter or douser, said bar 74 is provided with an upwardly extending arm or neck 77 which is engaged by a long lever 78 extending to the front of the lamp and operating from a handle member 79 pivoted at 80. By throwing said handle down into the dotted line position, the bar 78 is pushed to the rear and raised at its forward end into the dotted line position, thus rocking the arms 77 about their pivots 81 and rotating the shutters to the position shown in dotted lines, at the same time turning them through almost 90°, as shown in Fig. 2 and in dotted lines in Figs. 1 and 12. The shutters will remain in this elevated position until handle 79 is raised due to the toggle action of link 78 and the handle member 79, which are linked together at 98.

In order to shut off the light and heat from the film when the arc is occulted, we have shown an auxiliary forward shield 85 in the form of an arc shaped member which closes the front opening or door 86 of the lamp. Said member is connected by link 87 with the handle 79, so that it is closed at the same time the arc is occulted and opened when the occulter is moved to the upper position.

It should be observed that all operating and adjusting handles are mounted on the same side of the drum. These handles include the handle 17 for operating the negative feed, the handle 49 for the slow positive feed, and the handles 88 and 89 for adjusting the mirror either backwards or forwardly, or the inclination thereof.

We also provide in the top of the drum a slot 92 by which some of the light within the drum emerges to illuminate a glass name plate 93, the light appearing to make the same luminous since the letters are etched in the glass.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Many advantages are secured by this invention, which will be obvious to those skilled in the art. Thus, the releasable feed pinion 54 will outlast a fixed jaw or pin, since the teeth in engagement with the screw are frequently changed. Also, it will not jam when the end of the threads 46 is reached, but will positively stop the feed.

Having described our invention, what we claim and desire to secure by Letters Patent is:

1. In a projector lamp, a pair of complementary shields normally lying in operative position to each side of the negative electrode to protect the mirror during striking of the arc, means for pivoting said shields at the top of the lamp, operating means for rotating said shields to lie at the top of the lamp, and means for simultaneously turning said shields to clear the lamp parts.

2. A projector lamp comprising a main housing, a hinged part at the rear thereof, an electrode holder and feeding mechanism mounted within said part, a motor for feeding both electrodes mounted on said housing, and a two-part coupling between said motor and said mechanism requiring only juxtaposition to transmit power.

3. A projector lamp comprising a main housing, a hinged part at the rear thereof, an electrode holder and feeding mechanism mounted within said part, a mirror also mounted in said part, a second electrode holder and feeding mechanism mounted in said housing, and a common power means for driving both feeding means.

4. A projector lamp comprising a main housing, a hinged part at the rear thereof, an electrode holder and feeding mechanism mounted within said part, a reflector also mounted in said part, a second electrode holder and feeding mechanism mounted in said housing, and a hinged door to the rear of said part, whereby the first named electrode may be trimmed from the rear of the reflector.

5. In a projector lamp, a clamping carriage for an electrode, a feed screw for feeding the carriage and electrode, power means for rotating said screw for normal feed, a locked pinion on said carriage with which said screw meshes for normal feeding, and means for releasing said pinion for rapid adjustment of said carriage.

6. In a high intensity arc projector lamp having horizontally arranged electrodes, a clamping means for the rearward portion of each electrode, a fixed guide for the forward portion of each electrode, and means permitting limited play or movement of said clamping means to prevent misalignment of the electrode tips due to imperfect or crooked electrodes.

7. In an automatic projector lamp feed, a reciprocating part, a feed shaft for feeding an electrode, a one-way clutch for connecting said part and shaft, including a driven drum part, a second one-way clutch connecting said shaft and a fixed part and acting on said drum to assure step by step advancement of said shaft, a slip friction clutch between said drum and shaft, and a manual means for turning said shaft for direct adjustment of the electrode in either direction, said last named clutch permitting said manual feeding of the electrode.

8. A projector lamp comprising a main housing, a reflector mounted therein, an electrode holder and its support mounted in front of said reflector, a second electrode holder at the rear of said reflector, the forward portion thereof projecting through a hole in said reflector, and a rear door hinged on said housing whereby said second mentioned holder may be recarboned without moving the reflector.

9. A projector lamp comprising a main housing, a hinged part at the rear thereof, an electrode holder and feeding mechanism mounted within said part, a motor for feeding both electrodes mounted on said housing, a shaft reciprocated by said motor, a pawl or clutch member oscillated thereby for operating said feeding mechanism, and an adjustable member between said shaft and member to vary the stroke of the latter for each reciprocation of said shaft.

10. A projector lamp comprising a main housing, a reflector, an electrode holder in front of said reflector, a second electrode holder mounted at the rear of said reflector, the forward portion thereof projecting through a hole in said reflector, a rear door hinged on said housing whereby said second mentioned holder may be recarboned from the rear of the reflector without moving the reflector, said reflector and rear electrode holder both being mounted in a second hinged part at the rear of said housing and which may be opened for inspection and cleaning of the reflector.

11. In a projector lamp having a housing, an electrode holder, a feed screw for feeding the same, power means for rotating said screw, alternative hand means also for rotating said screw, a normally locked pinion on said holder with which the threads of said screw engage for imparting the feed, and means for releasing said pinion to permit quick sliding of said holder.

12. In a projector lamp having a housing and a mirror, a pair of complementary disc-like shields adapted in operative position to lie to each side of the negative electrode to protect the mirror during striking of the arc and to cut off light between the positive crater and the mirror when the lamp is lit, means for pivoting said shields near the wall of the lamp housing, operating means for rotating said shields to lie adjacent a wall of the housing outside of the reflected beam, and means for simultaneously turning said shields about a second axis to clear the lamp parts.

13. A projector lamp comprising a main housing, a hinged part at the rear thereof, an electrode holder and feeding mechanism mounted within said part, including a reciprocating member and a one-way clutch, a mirror also mounted in said part, a second electrode holder and feeding mechanism mounted in said housing, and a common power means for driving both feeding means.

14. In a high intensity arc projector lamp having horizontally arranged long, thin non-rotating electrodes, a clamping means for the rearward portion of each electrode by which current is led into the electrodes, a fixed guide for the forward portion of each electrode, and means permitting limited play or movement of said clamping means to prevent misalignment of the electrode tips due to imperfect or crooked electrodes.

15. In a projector lamp having a housing, a mirror and an electrode holder within said housing, a pair of complementary shields adapted in operative position to lie to each side of the negative electrode to protect the mirror during the striking of the arc and to cut off light between the positive crater and the mirror when the lamp is lit, means for pivoting said shields outside of the reflected beam, and operating means for rotating said shields to lie outside of the reflected beam.

16. A projector lamp comprising a main part, a hinged part at the rear thereof, an electrode holder and feeding mechanism mounted within each of said parts, a motor for feeding both electrodes mounted on one of said parts, and a separable two-part coupling between said motor and said mechanism in the other part requiring only juxtaposition to transmit power from said motor to said feeding mechanism.

17. A projector lamp comprising a main housing, a reflector mounted therein, an electrode holder and its support mounted in front of said reflector, a second electrode holder and its support mounted at the rear of said reflector, the electrode supported thereby extending through a hole in said reflector, a guide for the forward end of said electrode in front of said reflector, and a rear door hinged on said housing whereby said second mentioned electrode holder may be recarboned without moving the reflector.

18. In a feeding means for an electrode of arc lamps, a clutch drum, similarly acting one-way clutch members acting on said drum, power means for oscillating one of said clutch members through a variable stroke to feed the electrode step by step, said other clutch member being relatively stationary during the return stroke of the first mentioned clutch member, an electrode feed member, and a slip friction connection between said drum and said feed member, whereby said electrode may be fed by hand in either direction.

19. In a feeding means for an electrode of projector lamps, a clutch drum, a one-way clutch acting on said drum, power means for oscillating said clutch through a variable stroke to rotate said drum step by step, a feed shaft on which said drum is loosely mounted, a pair of friction discs on opposite sides of said drum and frictionally gripping the same, at least one of said discs being secured to said feed shaft, and hand means for also turning said shaft for hand feeding of the electrode.

JOHN E. McAULEY.
GUY R. TREVILLIAN.